US012000290B2

(12) United States Patent
Lemonnier et al.

(10) Patent No.: US 12,000,290 B2
(45) Date of Patent: Jun. 4, 2024

(54) CONTROL METHOD AND UNIT FOR CONTROLLING THE CLEARANCE OF A HIGH-PRESSURE TURBINE TO REDUCE THE EFFECT OF EGT OVERSHOOT

(71) Applicant: SAFRAN AIRCRAFT ENGINES, Paris (FR)

(72) Inventors: Jérôme Claude George Lemonnier, Moissy-Cramayel (FR); Damien Bonneau, Moissy-Cramayel (FR); Cécile Racinet, Moissy-Cramayel (FR); Antoine Bruno Van Noort, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/757,981

(22) PCT Filed: Jan. 4, 2021

(86) PCT No.: PCT/FR2021/050004
§ 371 (c)(1),
(2) Date: Jun. 24, 2022

(87) PCT Pub. No.: WO2021/140292
PCT Pub. Date: Jul. 15, 2021

(65) Prior Publication Data

US 2023/0044006 A1 Feb. 9, 2023

(30) Foreign Application Priority Data

Jan. 8, 2020 (FR) ....................................... 2000131

(51) Int. Cl.
*F01D 11/24* (2006.01)

(52) U.S. Cl.
CPC ........ *F01D 11/24* (2013.01); *F05D 2220/323* (2013.01); *F05D 2240/55* (2013.01); *F05D 2260/201* (2013.01)

(58) Field of Classification Search
CPC .......... F01D 11/24; F01D 11/14; F01D 11/20; F05D 2260/201; F05D 2240/55;
(Continued)

(56) References Cited

U.S. PATENT DOCUMENTS 4,999,991 A 3/1991 Haddad et al.
2001/0001845 A1 * 5/2001 Khalid .................... F01D 21/04
701/100

(Continued)

FOREIGN PATENT DOCUMENTS

EP 2799668 A2 11/2014
EP 3091194 A1 11/2016

(Continued)

OTHER PUBLICATIONS

International Search Report with English Translation and Written Opinion issued in International Application PCT/FR2021/050004 on Apr. 21, 2021 (11 pages).

(Continued)

*Primary Examiner* — Juan G Flores
*Assistant Examiner* — Ryan C Clark
(74) *Attorney, Agent, or Firm* — Bookoff McAndrews, PLLC

(57) ABSTRACT

Method for controlling a clearance between the tips of the blades of a rotor of an aircraft engine turbine and a turbine ring, comprising the estimation of the clearance to be controlled and the control of a valve delivering an air stream directed towards the turbine ring based on the thus estimated clearance, this method comprising: the detection of a transient acceleration phase based on at least one parameter
(Continued)

representative of the engine; the receipt of a data relating to the altitude of the aircraft; the determination of data representative of the temperature of the rotor during the transient acceleration phase and in steady speed and the calculation of a relative temperature deviation.

10 Claims, 4 Drawing Sheets

(58) Field of Classification Search
CPC ........... F05D 2220/323; F05D 2240/11; F05D 2270/112; F05D 2270/303; F05D 2270/304; F05D 2270/309; F05D 2270/44
See application file for complete search history.

(56) References Cited

U.S. PATENT DOCUMENTS

| | | | | |
|---|---|---|---|---|
| 2008/0069683 | A1* | 3/2008 | Nigmatulin | F01D 11/24 415/1 |
| 2013/0177414 | A1* | 7/2013 | Bonneau | F01D 5/02 416/1 |
| 2014/0321985 | A1 | 10/2014 | Lewis | |
| 2015/0142216 | A1* | 5/2015 | Tillman | F02C 7/18 701/3 |
| 2016/0326901 | A1 | 11/2016 | Rowe et al. | |
| 2017/0114725 | A1* | 4/2017 | Holt | F01D 11/24 |
| 2017/0292399 | A1* | 10/2017 | Philbrick | F01D 5/02 |
| 2019/0078459 | A1* | 3/2019 | Eastwood | F01D 17/06 |
| 2019/0085710 | A1* | 3/2019 | van der Merwe | F01D 11/16 |
| 2019/0136708 | A1* | 5/2019 | Sebastian | F01D 25/243 |
| 2020/0362719 | A1* | 11/2020 | Brusq | F02C 3/062 |

FOREIGN PATENT DOCUMENTS

| | | | |
|---|---|---|---|
| FR | 3078362 | A1 | 8/2019 |
| WO | 2012107670 | A1 | 8/2012 |
| WO | 2014068236 | A1 | 5/2014 |

OTHER PUBLICATIONS

European Patent Office Communication issued in corresponding European Application No. 21 705 233.1, issued on Sep. 21, 2023.

* cited by examiner

[Fig. 1]
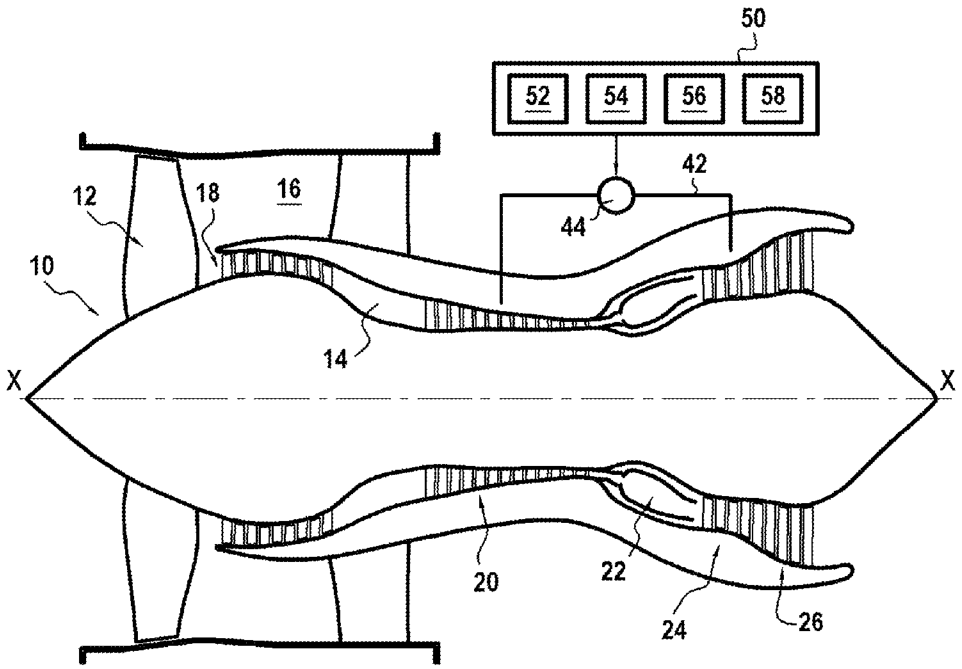

[Fig. 2]
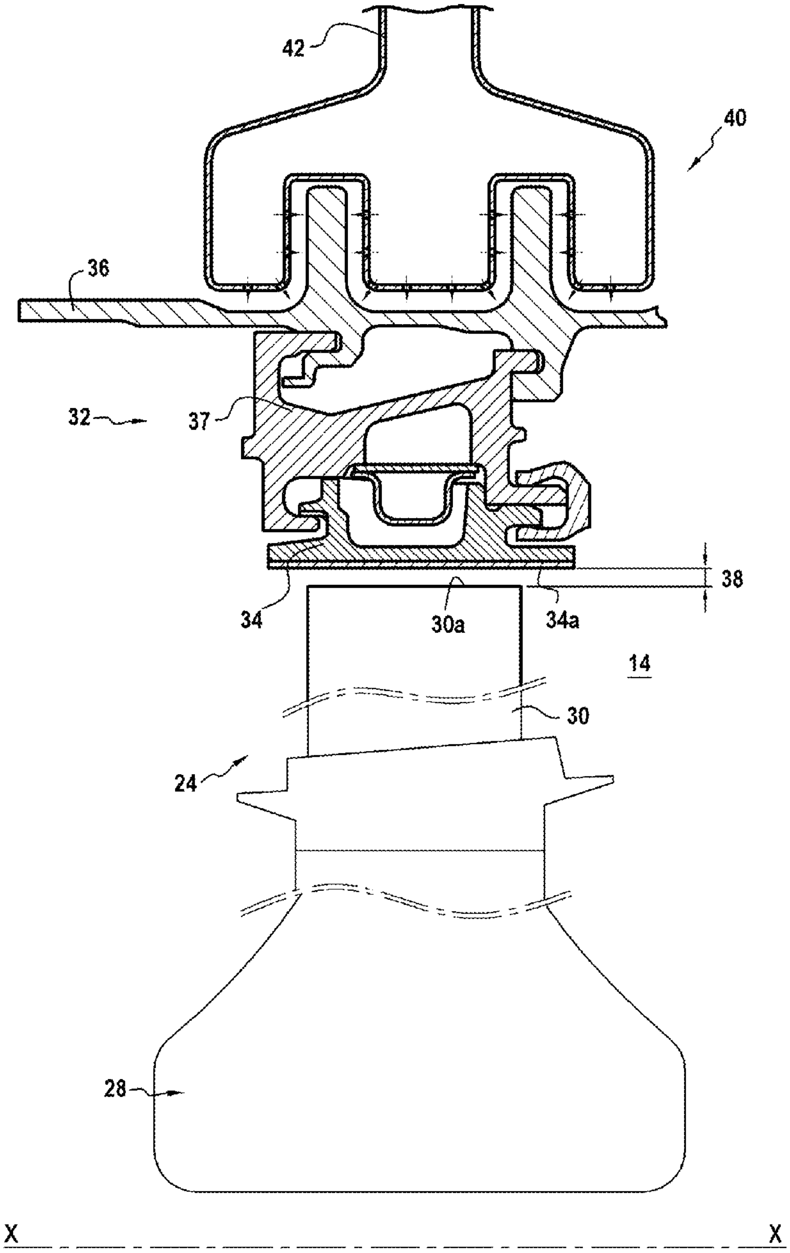

[Fig. 3]
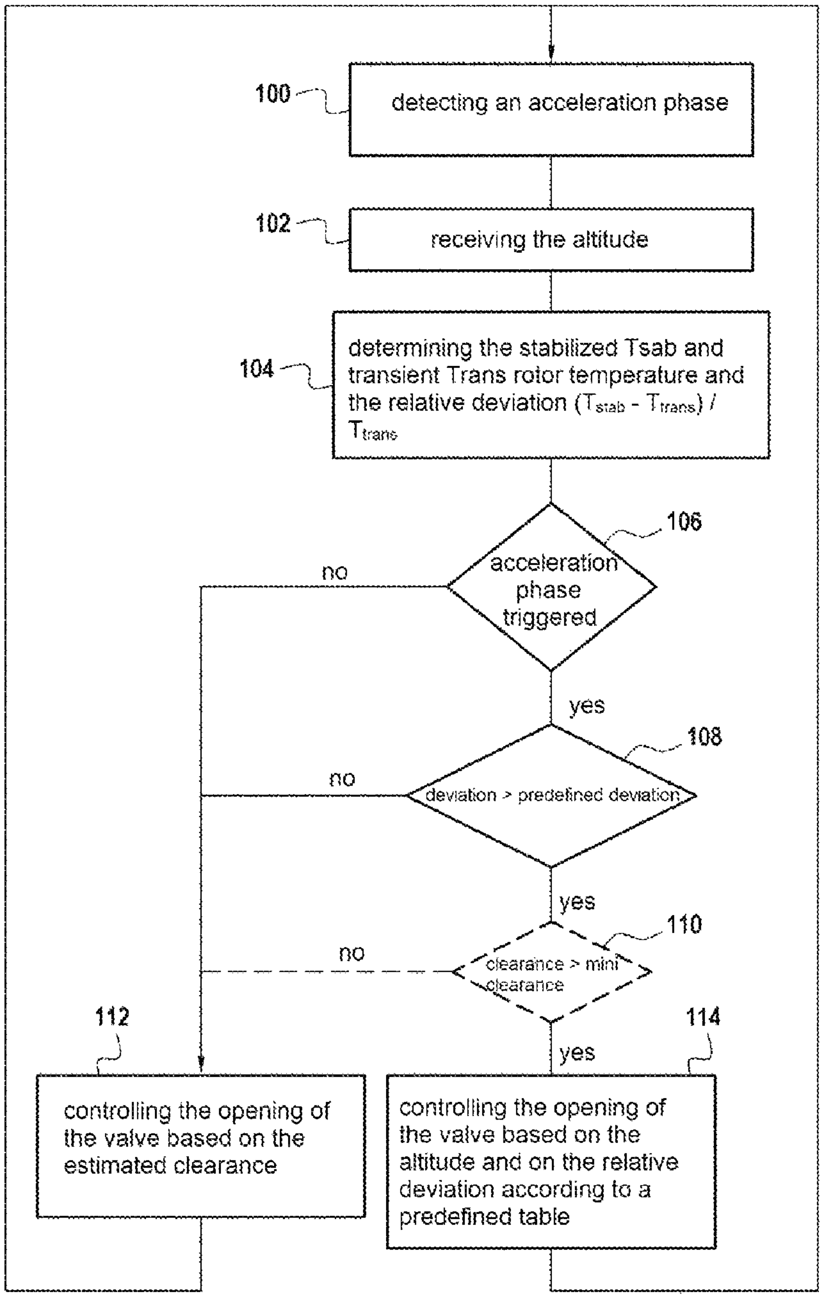

[Fig. 4]
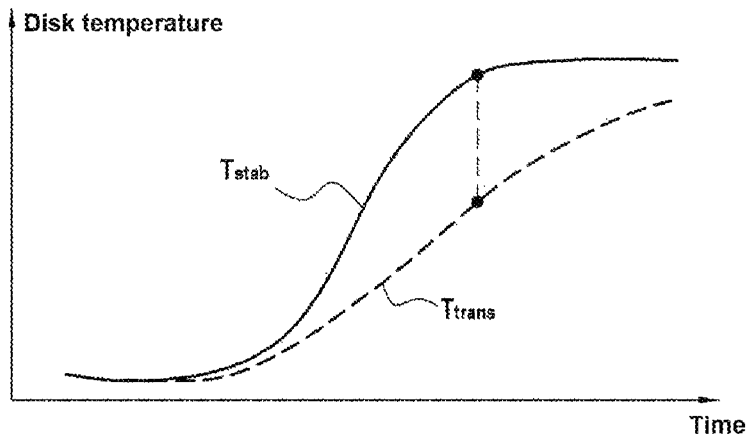
[Fig. 5]
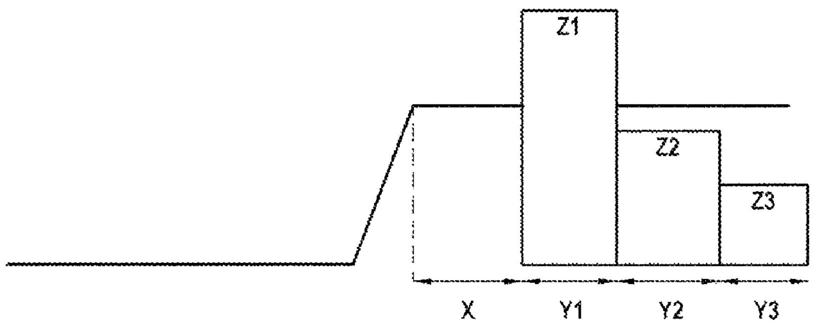

CONTROL METHOD AND UNIT FOR CONTROLLING THE CLEARANCE OF A HIGH-PRESSURE TURBINE TO REDUCE THE EFFECT OF EGT OVERSHOOT

CROSS-REFERENCE TO RELATED APPLICATION(S)

This application is a National Stage Application of International Application PCT/FR2021/050004, filed on Jan. 4, 2021, now published as WO 2021/140292 A1, and which claims priority to French Patent Application No. 2000131, filed on Jan. 8, 2020.

TECHNICAL FIELD

The present invention relates to the general field of turbomachines for aeronautical gas turbine engines. It aims more specifically the control of the clearance between, on the one hand, the tips of the blades of a turbine rotor and, on the other hand, a turbine ring of an outer casing surrounding the blades.

PRIOR ART

The clearance existing between the tip of the blades of a turbine and the ring surrounding them is dependent on the differences in the dimensional variations between the rotating parts (disk and blades forming the turbine rotor) and the fixed parts (outer casing including the turbine ring it comprises). These dimensional variations are at the same time of thermal origin (related to the temperature variations of the blades, of the disk and of the casing) and of mechanical origin (in particular related to the effect of the centrifugal force exerted on the turbine rotor).

To increase the performance of a turbine, it is desirable to minimize the clearance as much as possible. On the other hand, upon a speed increase, for example upon transition from a ground idle speed to a take-off speed in a turbomachine for an aeronautical engine, the centrifugal force being exerted on the turbine rotor tends to bring the blade tips closer to the turbine ring before the turbine ring has had time to expand under the effect of the temperature increase related to the speed increase. There is therefore a risk of contact at this operating point called pinch point.

It is known to use an active control system to control the clearance in the tips of the blades of a turbomachine turbine. A system of this type generally operates by directing onto the outer surface of the turbine ring air taken for example at the level of a compressor and/or of the turbomachine fan. If this air is cool, by being sent on the outer surface of the turbine ring, this has the effect of cooling the latter and thus limiting its thermal expansion. The clearance is thus minimized. Conversely, if this air is hot, this promotes the thermal expansion of the turbine ring, which increases the clearance and for example allows avoiding contact at the aforementioned pinch point.

Such active control is monitored by a control unit, for example by the Full Authority Digital Engine Control (or FADEC) of the turbomachine. Typically, the control unit acts on a position-regulated valve to control the flow rate and/or the temperature of the air directed on the turbine ring, based on a clearance setpoint and on an estimation of the actual blade tip clearance.

The turbomachine furthermore has an engine operating limit temperature defined with respect to a combustion gas limit temperature determined downstream of its combustion chamber, more particularly downstream of the high-pressure turbine of the engine. This temperature is commonly referred to as "Red Line EGT" and is identified as the maximum permissible engine temperature and determined during ground conducted tests (Block Tests) by the manufacturer, then communicated by the latter. In other words, the Red Line EGT is the maximum value declared by the manufacturer, this value being certified based on the life cycle of the engine (ex: new or reconditioned engine). Once this limit is reached, the engine is removed for maintenance in order to restore a positive EGT margin. It is meant here by "EGT margin" the difference between the Red Line EGT certified by the manufacturer and a temperature of the combustion gases determined downstream of the combustion chamber of the engine.

The temperature of the combustion gases downstream of the combustion chamber of the engine is generally maximum during a phase of rapid acceleration, taking into account the thermal response of the engine. Typically, about 60 seconds after an acceleration phase, the clearance between the rotor blades of the high-pressure turbine and the ring surrounding them increases. Temperatures ranging from 20 to 30K higher compared to a temperature of the engine at steady speed are measured downstream of the combustion chamber, for example at the outlet of the high-pressure turbine, the steady speed being obtained after a given time interval following the phase of acceleration of the engine.

The temperature difference between the maximum temperature of the combustion gases determined during a phase of acceleration of the turbomachine and the temperature of its steady speed determined following this acceleration phase is commonly referred to as "Overshoot EGT".

During an acceleration phase, the optimization of the clearance between the rotor blades of the high-pressure turbine and the ring surrounding them can reduce the EGT overshoot, and therefore the maximum temperature of the combustion gases. However, such optimization may present a risk of premature wear of the high-pressure turbine. For example, a too large reduction in the EGT overshoot related to a prolonged reduction in the clearance of the high-pressure turbine for a new hot engine or already having a minimized clearance of its high-pressure turbine, can lead to a pinch point between the blades and the ring of the high-pressure turbine. Thus, the limitation of an EGT overshoot, whose duration is on the order of ten minutes, may present a risk of permanent degradation of the blades of the high-pressure turbine, then affecting the overall performances of the engine and its fuel consumption.

It therefore appears desirable to reduce or even eliminate the EGT overshoot phenomenon during the engine speed variations, while avoiding the possible risk of degradation of the high-pressure turbine blades.

A method allowing a reduction of this EGT overshoot phenomenon is known with the application FR3078362 filed in the name of the Applicant. It implements a threshold temperature T2 (<T1 maximum acceptable temperature) below which the valve bringing the air stream closes. However, a threshold temperature T2 too close to T1 will involve, to deal with this phenomenon, a large number of valve openings/closings likely to generate significant temperature oscillations and a strong load on the control system. The risk of failure of the valve and of the control system as a whole will be significantly increased. On the contrary, a too low threshold temperature T2 will avoid the oscillation phenomenon but will risk cooling the casing too much, thus significantly increasing the risk of contact and wear of the turbine blades. The required compromise between these two values, if possible, therefore proves to be difficult to find.

Furthermore, this method assumes that all the observed EGT overshoots are due to the high-pressure turbine clearance, although this is not necessarily the case.

DISCLOSURE OF THE INVENTION

The present invention aims to overcome the aforementioned drawbacks and particularly to propose a valve control method optimizing the clearance at the turbine blade tip and in particular differentiating between the different types of maneuvers and flight conditions which can generate such an EGT overshoot phenomenon (Altitude, idle time, go-around, flight or ground conditions, etc.).

To this end, the invention proposes a method for controlling a clearance between, on the one hand, tips of the blades of a rotor of a high-pressure turbine of a gas turbine aircraft engine and, on the other hand, a turbine ring of a casing surrounding said blades of the high-pressure turbine, the method comprising the estimation of the clearance to be controlled and the control of a valve delivering an air stream directed towards said turbine ring based on the thus estimated clearance, this method being characterized in that it comprises the following steps:

- detecting a transient phase of acceleration of the engine based on at least one parameter representative of the engine;
- receiving a data relating to the altitude of the aircraft;
- determining data representative of the temperature of said rotor of the high-pressure turbine of the engine during the transient acceleration phase and in steady speed and calculating a relative temperature deviation between said temperature data obtained during the transient acceleration phase and in steady speed;
- if said transient acceleration phase is detected and if said relative temperature deviation is greater than a predetermined minimum temperature deviation, defining a level of opening and a time of opening of the valve by a predefined altitude/relative temperature deviation lookup table; and
- controlling the opening of the valve at the opening level and during the opening time defined to deliver said air stream to the turbine ring.

Thus, the method above allows covering all the maneuvers and conditions of use likely to generate an EGT overshoot phenomenon, regardless of the level of wear of the high-pressure turbine. The introduction of a dynamic table based on the temperature of the high-pressure turbine and the altitude allows better adapting the level of opening and the duration of opening of the valve during this EGT overshoot phenomenon.

Preferably, the definition of the level of opening and time of opening of the valve from a predefined altitude/relative temperature deviation lookup table is made only if said estimated clearance is also greater than a predetermined minimum clearance.

Taking into account, in the method, a predetermined minimum clearance obtained on engine tests allows preventing any risk of wear of the turbine, the performances of the turbomachine are therefore improved and the shelf life of a positive EGT margin is extended, which allows increasing the service life of the engine and postponing its removal for maintenance.

Advantageously, the control of the opening of the valve also includes a timing on its opening defining a time limit from which the valve is open at the desired opening level and for the desired opening time following the detection of the transient acceleration phase.

Preferably, the transient phase of acceleration of the engine is detected from the deviation between the temperature in steady speed Tstab and the temperature in transient acceleration phase Ttrans.

Advantageously, said at least one parameter representative of the engine is chosen among: the speed of a low-pressure turbine of the engine, the speed of the high-pressure turbine, a pressure measured at a high-pressure compressor, the angular position of a throttle control lever of the aircraft and the data representative of the temperature of the gases at the outlet of the combustion chamber of the engine.

Preferably, the data representative of the temperature of the rotor is an estimate of the temperature of a rotor disk of the high-pressure turbine based on said at least one parameter representative of the engine.

The invention also proposes, according to another aspect, a control unit for controlling a clearance between, on the one hand, the tips of the blades of a rotor of a high-pressure turbine of a gas turbine aircraft engine and, on the other hand, a turbine ring of a casing surrounding said blades of the high-pressure turbine, the control unit comprising means for estimating the clearance to be controlled and means for controlling a valve, the valve being configured to deliver an air stream towards said ring of the turbine based on the thus estimated clearance, the control unit being characterized in that it comprises:

- detection means configured to detect a transient phase of acceleration of the engine based on at least one parameter representative of the engine;
- receiving means configured to receive a representative data relating to the altitude of the aircraft;
- calculation means configured to determine data representative of the temperature of said rotor of the high-pressure turbine of the engine during the transient acceleration phase and in steady speed and to calculate a relative temperature deviation between said temperature data determined during the transient acceleration phase and in steady speed;
- the control means being configured to control an opening of the valve to deliver said air stream to the turbine ring at an opening level and for an opening time defined by a predefined altitude/relative temperature deviation lookup table, if the transient acceleration phase is detected and if said relative temperature deviation is greater than a predetermined minimum temperature deviation.

Preferably, the predefined altitude/relative temperature deviation lookup table delivers a value of the parameters {X, Y(i), Z(i)} for a given pair of values {Altitude; relative deviation (Tstab-Ttrans)/Tstab}, with:

- X defining a time limit after which the valve must open,
- Z(i) defining for a given plateau i the valve opening level,
- Y(i) defining the valve opening time for the plateau i and the opening level Z(i).

Advantageously, the valve is a position-regulated valve intended to remain in the closed position in the absence of power supply and whose position can be comprised between 0% (full closing), corresponding to a closed valve, and 100% (full opening).

The invention also proposes, according to another aspect, a gas turbine aircraft engine comprising the control unit summarized above and at least one valve to act on an air stream directed towards the turbine ring and in which the valve is controlled by the control means.

BRIEF DESCRIPTION OF THE DRAWINGS

Other characteristics and advantages of the present invention will become apparent from the description given below, with reference to the appended drawings which illustrate one exemplary embodiment without any limitation and on which:

FIG. 1 is a schematic view in longitudinal section of part of a gas turbine aircraft engine according to one embodiment of the invention, FIG. 2 is an enlarged view of the engine of FIG. 1 showing in particular the high-pressure turbine thereof, FIG. 3 is a block diagram of a valve control unit for controlling the blade tip clearance in the engine of FIG. 1 according to the invention, FIG. 4 illustrates the deviation existing between the transient temperature and the stabilized temperature; and FIG. 5 shows the valve control time logic according to the invention with the evolution of the engine speed.

DESCRIPTION OF THE EMBODIMENTS

FIG. 1 schematically represents a twin-spool turbofan turbojet engine 10 to which the invention particularly applies. Of course, the invention is not limited to this particular type of gas turbine aircraft engine.

In a well-known manner, the turbojet engine 10 of longitudinal axis X-X in particular comprises a fan 12 which delivers an air stream into a primary stream flowpath 14 and into a secondary stream flowpath 16 coaxial with the primary stream flowpath. The primary stream flowpath 14 comprises, from upstream to downstream in the direction of flow of the gas stream passing therethrough, a low-pressure compressor 18, a high-pressure compressor 20, a combustion chamber 22, a high-pressure turbine 24 and a low-pressure turbine 26.

As represented more specifically by FIG. 2, the high-pressure turbine 24 of the turbojet engine comprises a rotor formed of a disk 28 on which a plurality of blades 30 disposed in the flowpath of the primary stream 14 are mounted. The rotor is surrounded by a turbine casing 32 comprising a turbine ring 34 carried by an outer turbine casing 36 via a fixing support 37.

The turbine ring 34 can be formed of a plurality of adjacent sectors or segments. On the inner side, it is provided with a layer 34*a* of abradable material and surrounds the blades 30 of the rotor by arranging a clearance 38 with their tips 30*a*.

In accordance with the invention, there is provided a system for controlling the clearance 38 by modifying, in a controlled manner, the inner diameter of the outer turbine casing 36. To this end, a control unit 50 controls the flow rate and/or the temperature of the air directed towards the outer turbine casing 36. The control unit 50 is for example the Full Authority Digital Engine Control (or FADEC) of the turbojet engine 10.

In the example represented, a control housing 40 is disposed around the outer turbine casing 36. This housing receives fresh air by means of an air duct 42 opening at its upstream end into the flowpath of the primary stream at one of the stages of the high-pressure compressor 20 (for example by means of a scoop known per se and not represented in the figures). The fresh air circulating in the air duct is discharged onto the outer turbine casing 36 (for example using a multi-perforation of the walls of the control housing 40) causing its cooling and therefore a decrease in its inner diameter.

As represented in FIG. 1, a valve 44 is disposed in the air duct 42. This valve 44 is controlled by the control unit 50 and is provided to remain in the closed position in the absence of power supply.

The valve 44 is a continuously position-regulated valve between the 0% fully closed position (closed valve) and the 100% fully open position (completely open valve).

When the valve 44 is fully open (100% position), the fresh air is supplied to the outer turbine casing 36, resulting in a thermal contraction of the latter and therefore a reduction in the clearance 38. On the contrary, when the valve 44 is fully closed (0% position), the fresh air is not supplied to the outer turbine casing 36 which is therefore heated by the primary stream. This results either in thermal expansion of the casing 36 and an increase in the clearance 38 or in at least a monitored limitation (or even a stop) of the expansion of the casing 36. In the intermediate positions, the outer turbine casing 36 contracts or expands and the clearance 38 increases or decreases, to a lesser extent.

Of course, the invention is not limited to this example. Thus, another example may consist of taking air at two different stages of the compressor and controlling valves 44 to modulate the flow rate of each of these samples to adjust the temperature of the mixture to be directed on the outer turbine casing 36.

The control of the valve 44 by the control unit 50 is now described.

In accordance with the invention, the control unit 50 comprises:

- detection means 52 configured to detect a transient phase of acceleration of the turbojet engine 10 over a predetermined time interval;
- receiving means 54 configured to receive a data relating to the altitude of the aircraft;
- calculation means 56 configured to determine data representative of the temperature of the rotor of the high-pressure turbine 24 of the turbojet engine 10 during this transient acceleration phase and in steady speed in order to deduce therefrom by calculation a relative temperature deviation from the aforementioned temperature data;
- control means 58 configured to define a level of opening and a time of opening of the valve 44 and to control the valve 44 according to a dynamic table predefined based on the altitude and of the relative deviation between the temperature in steady speed and the temperature in transient acceleration phase.

The detection means 52, the receiving means 54, the calculation means 56 and the control means 58 form together a valve control module 44 integrated into the control unit 50. This control module corresponds for example to a computer program executed by the control unit 50, to an electronic circuit of the control unit 50 (for example of the programmable logic circuit type) or to a combination of an electronic circuit and a computer program.

It is meant here by "transient phase of acceleration of the turbojet engine 10" a speed transition related to a phase of acceleration of the turbojet engine 10 occurring between two steady speeds of the latter. The transient acceleration phase to be detected using the detection means 52 can for example correspond to a transition between the ground idle speed and the steady speed (called take-off), that is to say to the acceleration phase between these two speeds. In another example, the transient acceleration phase can correspond to the acceleration phase between any intermediate speed (e.g.: half throttle) and the flight speed.

The different steps of the clearance control method 38 implemented in the control unit 50 are now described in relation to FIG. 3. It is understood that the order of some of these steps illustrated in these figures is given as illustration, in a non-illustrated example these steps being able to be carried out in parallel.

The first step 100 consists of the detection of this transient phase of acceleration of the turbojet engine 10 which can be carried out based on one or several parameters representative of the turbojet engine 10.

A parameter representative of the turbojet engine 10 is for example its rotational speed, but other parameters can also be used such as: the speed of the high-pressure turbine 24, the speed of the low-pressure turbine 26, the angular position of the throttle control lever of the aircraft, a measured or calculated temperature of the combustion gases at the outlet of the combustion chamber 22 or a pressure measured at the high-pressure compressor 20. The detection of a transient phase of acceleration of the turbojet engine 10 is then carried out from a continuous determination of its speed, variations with respect to a setpoint characterizing a speed variation of the turbojet engine 10. Thus, if during the predetermined interval the variation of the rotational speed of the turbojet engine 10 is greater than or equal to a variation threshold characterizing a transient phase of acceleration of the turbojet engine 10, the detection means 52 detect a transient acceleration phase.

Then in a step 102, or preferably in parallel, the receiving means 54 receive a data representative of the altitude of the aircraft (also making it possible to define whether the aircraft is flying or on the ground).

In a next step 104, two data representative of the temperature of the rotor (disk 28 and blades 30) of the high-pressure turbine 24 of the turbojet engine 10 are determined by the calculation means 56. These data representative of the temperature of the rotor are on the one hand a first temperature Tstab estimated in permanent or steady speed and on the other hand a second temperature Ttrans estimated during the transient acceleration phase. The first temperature in steady speed Tstab is preferably determined from the engine data detected in step 100 and the second temperature in transient acceleration phase Ttrans is determined from a formulation which is a function of the response time of the temperature representative of the rotor disk.

By way of example, the data representative of the first temperature Tstab can be estimated by a polynomial, which is a function of the pressures and temperatures measured in the engine, and is given by the following formula:

$$T_{stab} = C_0 + \sum_{i=1}^{n} C_i * P_i + \sum_{j=n+1}^{m} C_j * T_j$$

i, j being integers;

CO, Ci and Cj representing the coefficients of the polynomial;

Pi representing pressures in the engine;

Ti representing temperatures in the engine;

And the data relating to the second temperature Ttrans is given by:

$$T_{tran}(t+\Delta t)=T_{tran}(t)+(T_{stab}(t)-T_{tran}(t))*(1-\exp^{(-\Delta t/\xi)})$$

with ξ being a function of an engine pressure parameter.

The calculation means 56 then determine by calculation a relative deviation between the temperatures Tstab and the temperatures Ttrans, that is to say the ratio (Tstab−Ttrans)/Tstab. This relative temperature deviation will allow on the one hand confirming the transient acceleration phase (it will be noted that this is an alternative example of detection of this transient phase), the transient temperature presenting a delay on the stabilized temperature, there is necessarily a positive deviation, (see FIG. 4) between the stabilized temperature after acceleration and the transient temperature at the beginning of the plateau after acceleration, and on the other hand detecting a high risk of EGT overshoot. Indeed, the greater the deviation, the longer the disk 28 will take to expand and a high clearance deviation at the beginning of steady speed (which is at the origin of the EGT overshoot) will take time to diminish.

The three following steps 106, 108 and 110 are test steps carried out by the control unit 50 to identify, from the detection means 52, the receiving means 54 and the calculation means 56, the possible occurrence of an EGT overshoot situation for which:

- a transient phase of acceleration of the turbojet engine is detected,
- the relative temperature deviation is greater than a predefined minimum deviation, and optionally
- the clearance estimated by an on-board clearance model for the needs of the control system is greater than a predetermined minimum clearance which is a function of the operating conditions of the engine.

Reaching the minimum temperature deviation threshold in parallel with the detection of a transient phase of acceleration of the turbojet engine allows clearly distinguishing the significant and rapid accelerations which are the most at risk for the EGT overshoot.

Similarly, when the test 110 is present, reaching the minimum clearance threshold in parallel with the detection of a transient phase of acceleration of the turbojet engine ensures protection against the risk of wear, the specific control of the valve being activated only if the estimated current clearance is greater than the minimum clearance.

After each test step 106, 108, 110 the control unit 50 tries to detect the possible occurrence of one of the three aforementioned conditions.

If the occurrence of such a situation is not identified, the control unit 50 deduces the non-occurrence of an EGT overshoot and ensures, in a final step 112, the control of the valve 44 conventionally based on the estimated setpoint clearance 38 then the process returns to the initial step 100 to detect a possible acceleration phase likely to generate this time an EGT overshoot. This conventional control is based on the comparison of the clearance coming from a clearance calculator integrated into the FADEC and a setpoint clearance (which is generally a clearance to be reached in order to maximize the performance of the turbine or in order to protect it from wear according to the conditions of use). This clearance estimation is made as known instantaneously from engine and aircraft data.

Conversely, if the aforementioned situation is detected (positive response to each of the two or three tests of steps 106, 108, 110), the control unit 50 deduces an EGT overshoot situation which it then seeks to minimize by acting on the clearance 38 of the high-pressure turbine 24 by a specific control of the valve 44 in an alternative final step 114. Indeed, in the absence of action, such a situation would risk reducing the EGT margin of the engine and therefore its duration of use before its removal for maintenance. This direct action on the clearance 38 then aims to maintain a positive EGT margin as long as possible. As previously, once the clearance has been controlled and a steady speed has been reached, the process returns to the initial step 100 to detect a possible new acceleration phase likely to generate an EGT overshoot.

The specific control of the valve to reduce the EGT overshoot is illustrated in FIG. 5 and it is carried out by an action on the amplitude and the duration of opening of the valve 44 via the following three parameters:

X: This first parameter defines a time limit from which the valve opens following the detection of an EGT overshoot in relation to the detection of the stabilization of the reached speed (Timing on the opening in seconds), Z(i): This second parameter defines for a given plateau i the valve opening level (100%=fully open valve; 50%=half open valve; 0%=fully closed valve), Y(i): This third parameter defines the valve opening time (in seconds) for the plateau i and the opening level Z(i).

All these parameters are presented in a predefined dynamic table based on the altitude and the relative deviation between the stabilized temperature Tstab and the transient temperature Ttrans. For a given pair of values {Altitude; relative deviation (Tstab−Ttrans)/Tstab}, there is a value of the parameters {X, Y(i), Z(i)} that is best suited to reducing the EGT overshoot. The number of plateaus is only limited by the memory capacities of the control unit 50 and the type of valve used. It is therefore quite possible to integrate more than three levels. If this memory capacity is limited, it is possible to delete the first parameter.

Similarly, the number of levels is determined by the type of valve: if a regulated valve is used, then there are an infinite number of possible levels. If an on/off valve is used, then there are only two possible levels.

Thus, the control of a valve 44 as described above allows maintaining a positive EGT margin based on the thermal state of the rotor and the rotational speed of the turbine and covering all the maneuvers and conditions of use likely to generate an EGT overshoot phenomenon. The introduction of a dynamic table based on the relative temperature deviation at the high-pressure turbine rotor and the altitude allows best adapting the amplitude and the duration of opening of the valve during this phenomenon. Taking into account, in the method, a minimum clearance previously established on engine tests further allows an accurate estimation of the clearance at any time, thus preventing any risk of premature wear of the turbine.

The invention claimed is:

1. A method for controlling a clearance between tips of blades of a rotor of a high-pressure turbine of a gas turbine aircraft engine of an aircraft and a turbine ring of a casing surrounding said blades of the high-pressure turbine, the method comprising:

detecting a transient phase of acceleration of the engine based on at least one parameter representative of the engine;

receiving a data relating to an altitude of the aircraft;

determining data representative of a temperature of said rotor of the high-pressure turbine of the engine during the transient acceleration phase subsequent to determining data representative of a temperature of said rotor of the high-pressure turbine of the engine during a steady speed;

calculating a relative temperature deviation between said temperature data of the transient acceleration phase and the temperature data of the steady speed;

estimating the clearance to be controlled;

if said transient acceleration phase is detected and if said relative temperature deviation is greater than a predetermined minimum temperature deviation, defining a level of opening and a time of opening of a valve by a predefined altitude/relative temperature deviation lookup table; and controlling the opening of the valve at the opening level and during the opening time defined to deliver an air stream directed to the turbine ring based on said estimated clearance.

2. The method according to claim 1, for which the level of opening and the time of opening of the valve are defined from a predefined altitude/relative temperature deviation lookup table only if said estimated clearance is also greater than a predetermined minimum clearance.

3. The method according to claim 1, for which the control of the opening of the valve also includes a timing on its opening defining a time limit from which the valve is open at a desired opening level and for a desired opening time following the detection of the transient acceleration phase.

4. The method according to claim 1, wherein the transient phase of acceleration of the engine is detected from the deviation between the temperature data of the steady speed (Tstab) and the temperature data of the transient acceleration phase (Ttrans).

5. The method according to claim 1, wherein said at least one parameter representative of the engine is chosen among: a speed of a low-pressure turbine of the engine, a speed of the high-pressure turbine, a pressure measured at a high-pressure compressor, an angular position of a throttle control lever of the aircraft and the data representative of a temperature of gases at an outlet of a combustion chamber of the engine.

6. The method according to claim 1, wherein the data representative of the temperature of the rotor during the transient acceleration phase or the steady speed is an estimate of a temperature of a rotor disk of the high-pressure turbine based on said at least one parameter representative of the engine.

7. A control unit for controlling a clearance between tips of blades of a rotor of a high-pressure turbine of a gas turbine aircraft engine of an aircraft and a turbine ring of a casing surrounding said blades of the high-pressure turbine, the control unit comprising:

means for estimating the clearance to be controlled;

means for controlling a valve, the valve being configured to deliver an air stream towards said turbine ring based on said estimated clearance to be controlled;

detection means configured to detect a transient phase of acceleration of the engine based on at least one parameter representative of the engine;

receiving means configured to receive a data relating to an altitude of the aircraft;

calculation means configured to determine data representative of a temperature of said rotor of the high-pressure turbine of the engine during the transient acceleration phase subsequent to determining data representative of a temperature of said rotor of the high-pressure turbine of the engine during a steady speed, and to calculate a relative temperature deviation between said temperature data determined during the transient acceleration phase and the temperature data determined during the steady speed; and control means configured to control an opening of the valve to deliver said air stream to the turbine ring at an opening level and for an opening time defined by a predefined altitude/relative temperature deviation lookup table, if the transient acceleration phase is detected and if said relative temperature deviation is greater than a predetermined minimum temperature deviation.

8. The control unit according to claim 7, wherein the predefined altitude/relative temperature deviation lookup table delivers a value of the parameters {X, Y(i), Z(i)} for a given pair of values {Altitude; relative deviation (Tstab−Ttrans)/Tstab}, with: X defining a time limit after which the valve must open, Z(i) defining, for a given plateau i, the valve opening level, Y(i) defining the valve opening time for the plateau i and the opening level Z(i).

9. The control unit according to claim 7, wherein the valve is a position-regulated valve intended to remain in a closed position when without a power supply[,] and whose position can be comprised between 0% (full closing), corresponding to a closed valve, and 100% (full opening).

10. A gas turbine aircraft engine comprising a control unit according to claim 7 and at least one valve to act on an air stream directed towards the turbine ring and wherein the valve is controlled by the control means.

* * * * *